United States Patent [19]
Leighton et al.

[11] Patent Number: 5,167,823
[45] Date of Patent: Dec. 1, 1992

[54] OSCILLATORY LIQUID MEMBRANE SUPPORT

[76] Inventors: David T. Leighton, 60049 Cedar Rd., Mishawaka, Ind. 46544; Ajay K. Chandhok, 802 Napoleon Blvd., South Bend, Ind. 46617

[21] Appl. No.: 564,407

[22] Filed: Aug. 8, 1990

Related U.S. Application Data

[63] Continuation-in-part of Ser. No. 252,575, Sep. 30, 1988, Pat. No. 4,994,189.

[51] Int. Cl.⁵ .......................................... B01D 61/38
[52] U.S. Cl. ................................. 210/637; 210/643; 210/644; 210/321.67
[58] Field of Search .............. 210/637, 640, 638, 643, 210/490, 489, 644, 34.67

[56] References Cited

U.S. PATENT DOCUMENTS

| | | | |
|---|---|---|---|
| 3,956,112 | 5/1976 | Lee et al. | 210/220 |
| 4,280,909 | 7/1981 | Deutsch | 210/490 |
| 4,596,283 | 6/1986 | Ciprios et al. | 165/1 |
| 4,726,938 | 2/1988 | Rollat et al. | 210/643 X |
| 4,765,904 | 8/1988 | Kaplan | 210/637 |
| 4,770,675 | 9/1988 | Kurzweg et al. | 55/158 X |

OTHER PUBLICATIONS

F. J. M. Horn et al., "Mass transport under oscillatory fluid flow conditions", Chem. Eng. Science, 1967, vol. 22, pp. 1879-1880.
R. G. Rice, "Effect of Fluid Oscillations on Mass Transfer in Porous Media with Particular Reference to Fuel Cells", Fifth Australasian Conference on Hydraulics and Fluid Mechanics at University of Canterbury, Christchurch, New Zealand, Dec. 9-13, 1974.
R. G. Rice et al., "Mass Transfer Produced by Laminar Flow Oscillations", The Canadian Journ. of Chem. Engineering 48, pp. 46-51, Feb. 1970.
R. Rice, "Diffusive Mass Transfer Produced by Laminar Flow Oscillations", A dissertation in Chemical Engineering, presented to the faculty of the Graduate School of Arts and Sciences of the University of Pennsylvania, 1968.
G. Howell, "Separation of isotopes by oscillatory flow", Phys. Fluids 31(6), pp. 1803-1805 (Jun. 1988).
U. H. Kurzweg et al., "Heat transfer by high-frequency oscillations: A new hydrodynamic technique for achieving large effective thermal conductivities", Phys. Fluids 27 (11), Nov. 1984, pp. 2624-2627.

*Primary Examiner*—Frank Spear
*Attorney, Agent, or Firm*—Barnes & Thornburg

[57] ABSTRACT

The described apparatus is a multilayer liquid membrane support structure that can be used in devices for separating or purifying a desired chemical species. A inner layer is sandwiched between two outer layers to provide a porous support for a liquid membrane subject to oscillatory motion at a frequency selected to promote enhanced mass transport of the chemical species across the liquid membrane. The pores of the inner layer are selected to have an average pore diameter less than the pores of the outer layers.

4 Claims, 4 Drawing Sheets

OSCILLATORY LIQUID MEMBRANE SUPPORT

This is a continuation-in-part application of a copending U.S. patent application by Leighton et al., Ser. No. 07/252,575, filed Sep. 30, 1988, now U.S. Pat. No. 4,994,189.

FIELD OF THE INVENTION

The present invention relates to a liquid membrane support structure that can be used in devices for separating or purifying a desired chemical species. More particularly, this invention is directed to a porous support for a liquid membrane subject to oscillatory motion at a frequency selected to promote enhanced mass transport of the chemical species across the liquid membrane.

BACKGROUND AND SUMMARY OF THE INVENTION

Liquid membranes are formed by placing a liquid in contact with a substantially immiscible fluid. Industrial use of liquid membranes has been limited by the costs and difficulties associated with the creation and destruction of stable liquid membranes. Currently, liquid membrane separation techniques provide an attractive alternative to traditional separation processes only when the target species must be extracted to very low concentration levels. For example, even low levels of metal ions or organic compounds present in industrial wastewater can often be reduced to lower concentrations through application of liquid membrane technology.

One method of avoiding problems associated with creating and maintaining stable liquid membranes involves the use of porous supports having pores into which a liquid can be introduced. Because of surface tension arising from the interaction of the interior surfaces of the pores and the introduced liquid, these so-called supported liquid membranes are much more stable than liquid membranes not formed around a solid support. Although supported liquid membranes avoid problems associated with stabilization of the liquid membrane, they suffer from other practical problems such as limited surface area and low rates of mass transport. In effect, the stability problems are minimized at the cost of greatly reducing the rate of mass transport across the supported liquid membrane. This reduction in mass transport rate particularly diminishes opportunities for utilizing supported liquid membrane technology to separate mixtures containing large biomolecules. Biomolecules such as enzymes, antibodies, and other proteins naturally have low molecular diffusion rates, making mass transfer of such biomolecules by diffusion through a supported liquid membrane too slow for the process to be commercially practicable.

One method of increasing the mass transfer rate of supported liquid membranes is a subject of U.S. Pat. No. 4,994,189 to Leighton et al., filed Sep. 30, 1988, which describes a method and apparatus for increasing transfer of a selected solute species across a supported liquid membrane. A porous support is permeated with a liquid that is oscillated at a frequency selected to enhance the rate of mass transport of the solute species across the liquid membrane. By appropriate selection of oscillation frequency, large molecules having normally low diffusivities can be transported across the supported liquid membrane at a greater rate than small molecules having normally high diffusivities. This seemingly paradoxical reversal in mass transport rates of a solute species through pores containing a liquid subject to oscillatory motion is a consequence of the interaction between the radial diffusion of the solute species in the pores and the dispersion of the solute species across the pores as a result of laminar flow of the liquid. To appreciate this interaction, consider molecules of the selected solute species entering the liquid contained in a pore at the center of the interface between a fluid containing the molecules and the liquid in the pore. The molecule is transported some distance along the length of the pore by the laminar flow of the liquid in the pore during the first half of the oscillation cycle, and absent any other effects would ordinarily be transported back to its entry point during the second half of the liquid oscillation cycle as the liquid flow is reversed. The rate of mass transport across the length of the pores would be unchanged by this oscillating liquid flow, remaining dependent only on the rate of diffusion through the length of the pore, since the effects of non-diffusive flow transport are cancelled out by the oscillatory nature of the liquid flow. However, the mass transport rate across the length of the pores can be increased for molecules having a particular rate of diffusion in the liquid, if the oscillation frequency of the liquid is selected so that on the average the radial diffusion of the molecules from the center of the pore to the pore walls can take as a minimum about as long as half of one oscillation cycle. In that case the molecules, on the average, could radially diffuse from the center of the pore to near the walls of the pore during the course of the first half of one oscillation. When the flow reverses during the second half of the oscillation cycle, the molecules will not move backward to their entry point as quickly, since the velocity of laminar flow of the liquid near the pore walls is much less than the velocity of laminar flow near the center of the pores. The molecules tend to remain in the volume of the pore at the side opposite its entry into the pore liquid, giving the molecule a better chance of diffusing out of the pore on that side. Of course, other molecular paths are also likely, but the combined effect of oscillating fluid motion together with radial diffusion in the pore spaces is to greatly increase the dispersion, and hence the mass transport, along the length of the pores.

At low oscillation frequencies, this enhancement in mass transport works best for solute species having low radial diffusion rates. Solute species having high radial diffusion rates can move back and forth between the center of the pore and the pore walls many times during the course of one oscillation, making the average mass transport rate essentially no different than that provided by simple diffusion through the pores. Because the magnitude of the enhancement in mass transport rate of the selected solute species in the oscillated system is so much greater than of a non-oscillated system or of other molecular species not having the same rate of radial diffusivity, large, normally slowly diffusing solute species can be transported across the membrane fast enough to make industrial separations feasible using supported liquid membranes.

However, one difficulty associated with the use of homogeneous porous supports having essentially uniform pore diameters through the support could reduce the ability to use such supported liquid membranes in industrial separations. If the oscillations are induced by cyclic pressure changes, there is a possibility that the pressure change could exceed the capillary pressure in the pores of the supported liquid membrane. This could result in the expulsion of the fluid from the pores, destroying the liquid membrane.

It is therefore an object of this invention to provide an improved porous support for a liquid membrane capable of maintaining membrane stability under conditions of varying pressure that would destabilize liquid membranes supported by a homogeneous porous support.

Another object of this invention is to provide a porous support structure into which fluids can be introduced to form a liquid membrane capable of promoting separation of chemical species in a mixture by selective enhancement of transport of a desired chemical species across the supported liquid membrane.

Yet another object of this invention is to provide an oscillated, supported liquid membrane wherein oscillation of liquid within the support is controlled by cyclic pressure variations of a fluid contacting the liquid in the support.

In accordance with the foregoing objectives, the present invention provides a heterogeneous support for a liquid membrane that includes first and third layers. Both the first and third layers have a plurality of outer pores respectively extending therethrough. Sandwiched between the first and third layers is a second layer that is also formed to have a plurality of pores extending therethrough. The second layer is positioned between the first and second layers to allow fluid communication between the pores of the first layer and the pores of the second layer, and to also allow fluid communication between the pores of the third layer and the pores of the second layer. The pores of the first and third layers have an average pore diameter that is selected to be greater than that of the pores of the second layer.

In preferred embodiments the average pore diameter of the pores of the second layer are selected to range from about one-half to about one-twentieth the average pore diameter of the pores of the first and third layers. Typically, the average pore diameter of the pores of the first and third layers are selected to range from about 5 micrometers to about 50 micrometers, and the average pore diameter of the pores extending through the second layer are selected to range from about 0.5 micrometers to about 5 micrometers. To increase the capillary pressure in the pores, the walls of the pores can be coated with or formed from a hydrophobic material if a hydrophobic liquid is to be introduced into the pores, or can alternatively be treated with or formed from a hydrophilic material if a hydrophilic liquid is to be introduced into the pores.

The heterogeneous support can form part of an apparatus for enhancing mass transfer of a chemical species in a first fluid through a supported liquid membrane by selective enhancement of the mass transfer rate of selected chemical species across the length of pores extending through the heterogeneous support. A first chamber containing the first fluid is separated from a second chamber containing a second fluid by the heterogeneous support. A heterogeneous supported liquid membrane is formed by at least partially filling the pore spaces of the heterogeneous support with a liquid that is selected to be substantially immiscible with the first fluid contained in the first chamber. The liquid can be introduced into the pores of the heterogeneous support by immersion of the heterogeneous support into a bath of the liquid or by other means for forcing the liquid into the pores. The liquid in the heterogeneous support is then caused to oscillate at a predetermined frequency. This oscillation can be driven, for example, by cyclic pressure changes in either the first or second fluid contacting the liquid that forms the supported liquid membrane. The liquid in the pores of the heterogeneous support reversibly flows in a laminar flow regime from the first layer to the third layer, passing through the pores of the second layer, as a result of these externally driven fluid oscillations. However, because the capillary pressure in the pores of the second layer is greater than the maximum pressure difference between the first and second fluids contacting the liquid in the pores of the second layer, those pores always remain filled with the liquid, in effect acting to "pin" the liquid membrane in the heterogeneous support. The frequency of this "sloshing" oscillatory motion of the liquid through the pores of the heterogeneous support is selected to enhance the mass transfer rate of chemical species from the first chamber through the pores of the first and third layers and into the second chamber.

One advantage of the present invention is that heterogeneous supports can readily replace conventional homogenous supports in laboratory or industrial processes.

Another advantage of the present invention is that liquid in a supported liquid membrane can be induced to reversibly flow through the support by cyclic pressure changes created in a fluid contacting the liquid without separating from the support. This property is useful because large scale and industrial separation processes generally have an existing capability for pressure modification, and imposition and control of sinusoidal or other oscillatory pressure variations is relatively easy.

Yet another advantage of the present invention is the ability to construct heterogeneous supports by preparing a laminate of commonly available porous layers having differing pores sizes. Commercially available porous supports having generally uniform pores suitable for accomodating and supporting a liquid membrane are widely available. Laminates consisting of an inner porous layer sandwiched between two outer porous layers having larger pore diameters than the average pore diameter of the inner layer can be readily constructed.

Other objects, features, and advantages of the present invention will become apparent with reference to the following written description of the drawings and the examples of particular embodiments of the invention.

DETAILED DESCRIPTION OF THE INVENTION

Figure 1:
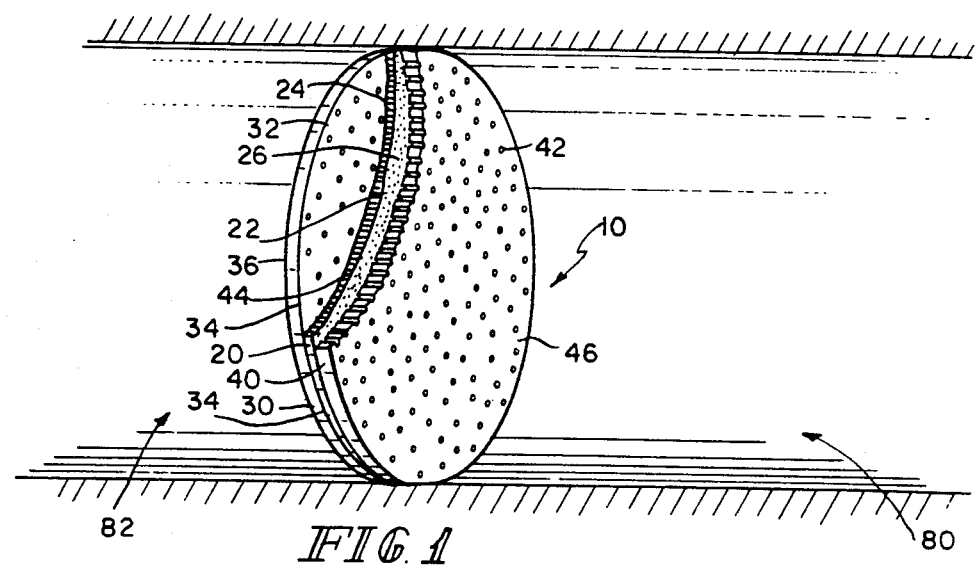
FIG. 1 is a perspective view of a heterogeneous support, partially cutaway to show the second layer sandwiched between a first layer and a third layer.
Figure 2:
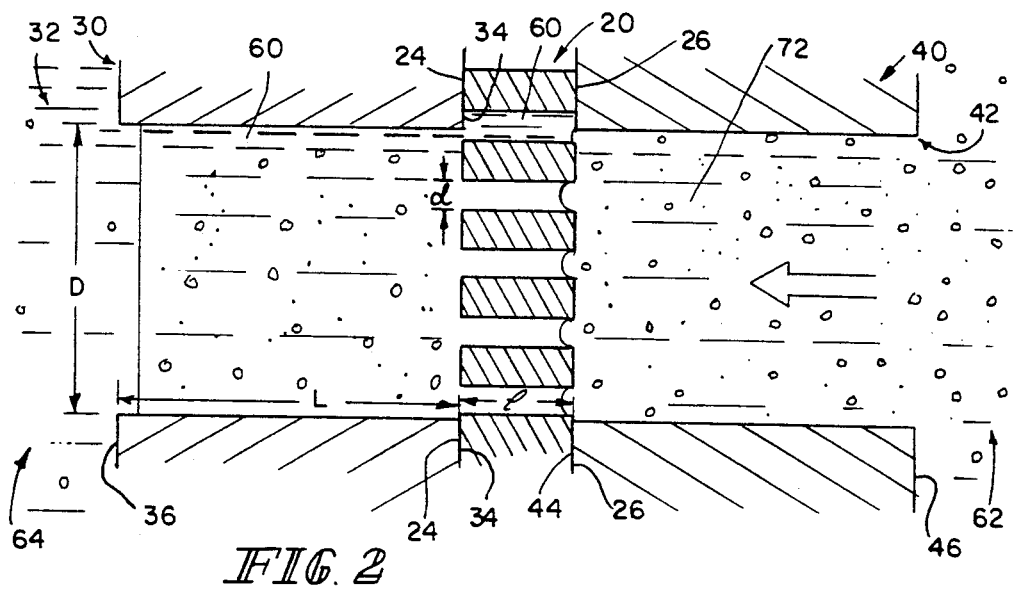
FIG. 2 is a diagrammatic cross sectional view (not to scale) of a small portion of a heterogeneous support, showing a pore in the first layer and a pore in the third layer in fluid communication with several pores in the second layer, with a liquid permeating the pores of the first and second layer to form a liquid membrane separating a first fluid located outside the pores and a second fluid filling the pores of the third layer.
Figure 3:
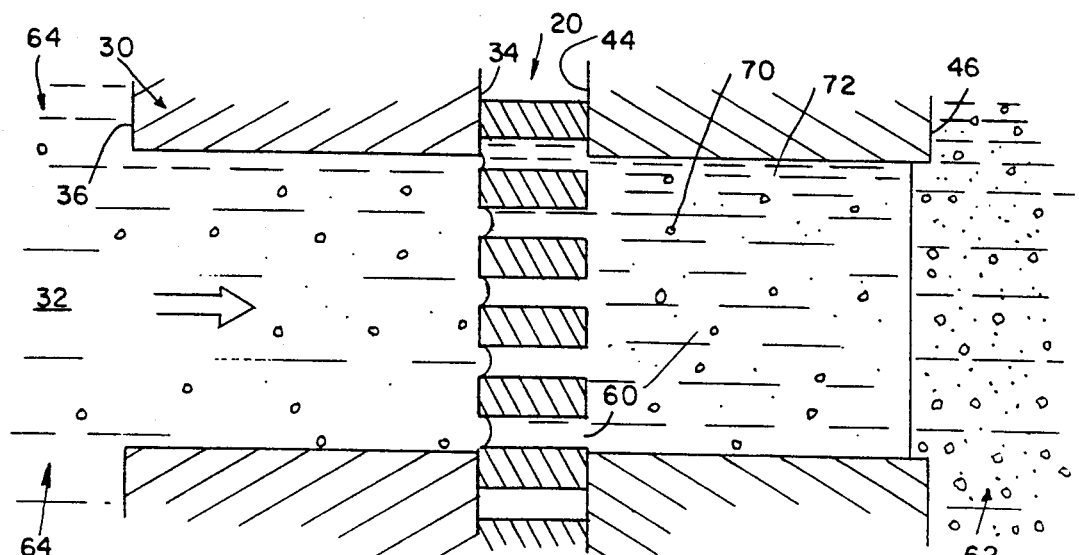
FIG. 3 is a cross sectional view of the small portion of the heterogeneous support shown in FIG. 2, showing the the liquid permeating the pores of the second and third layer to form a liquid membrane separating the second fluid located outside the pores and the first fluid filling the pores of the first layer.

As shown in FIGS. 1-3, a heterogeneous support 10 includes a second layer 20 positioned between a first layer 30 and a third layer 40. Extending completely through the second layer 20 are a plurality of pores 22 defined by pore walls 23 which permit fluid to pass from a first side 24 to a second side 26 of the second layer 20.

Contacting the first side 24 of the second layer 20 is an inner side 34 of the first layer 30. Extending completely through the first layer 30 are a plurality of pores 32 defined by pore walls 33 which permit fluid to pass from an outer side 36 to the inner side 34 of the first layer 30. Similarly, contacting the second side 26 of the second layer 20 is an inner side 44 of the third layer 40. Extending completely through the third layer 40 are a plurality of pores 42 defined by pore walls 43 which permit fluid to pass from an outer side 46 to the inner side 44 of the third layer 40.

A supported liquid membrane 12 is formed when a liquid 60 permeates the pores 22, 32, and 42 of the support 10 and is positioned in contact with fluids 62 and 64. The fluids 62 and 64 can be present as liquid or gas phases, and are respectively contained in chambers 80 and 82 as shown in FIG. 1. At least one of fluids 62 and 64 must be substantially immiscible with the liquid 60. The fluids 62 and 64 can contain several chemical species in solution. In FIGS. 2 and 3, a first chemical species 70 having a low diffusivity is represented by the large particles, and a second chemical species 72 having a high diffusivity relative to the first chemical species 70 is represented by the small particles. The concentration of the chemical species 70 and 72 in the fluids 62 and 64, and in the liquid 60, is intended to be proportionate to the number of particles shown in the Figures. As is evident from FIGS. 1 and 2, the concentration gradient favors diffusion of the chemical species 70 and 72 from the fluid 62 to the fluid 64.

For typical applications, a volume of fluid 60 sufficient to fill about half the total volume of the pores 22, 32, and 42 is introduced into the support 10. Introduction of the fluid can be accomplished by partial immersion, injection of the required amount of fluid 60, pulling the fluid 60 into the pores with an applied vacuum, or any other art recognized means for placing fluids in pores spaces.

To increase the retention of the introduced liquid 60 in the pores 22, 32, and 42, it is possible to form the layers 20, 30, and 40 out of material preferentially wetted by the liquid 60. Alternatively, the pores 22, 32, and 42 can be coated with a material that is hydrophobic if the liquid 60 is hydrophobic, or hydrophilic if the liquid 60 is hydrophilic. In preferred embodiments the pores 22, 32, and 42 are treated with a hydrophobic compound such as fluoroaliphatic resins, increasing the retention of the liquid 60 when it is composed of hydrophobic liquids such as aliphatic or aromatic hydrocarbons.

The pore walls 23, 33, and 43 can also be treated with a variety of immobilized molecular species that act as binding or absorptive agents, chemically reactive agents, or catalytic agents. These agents can react with the chemical species 70 as it diffuses across the liquid membrane 12. For example, chelators (not shown) covalently bound to the pore walls 23, 33, and 43 would improve the metal leaching characteristics of the heterogeneous support 10. Alternatively, a platinum coating of the pore walls 23, 33, and 43 (not shown) could act as a catalytic reactive site for various solute species. In many applications, the reactive species need not be bound to the support, but can also be present in solution in the liquid 60. If the heterogeneous support 10 has a three-dimensional structure with passageways linking pores extending through the layers 20, 30, and 40, the liquid 60 containing such reactive species could be continuously recharged with new reactive species.

The membrane-forming liquid 60 can be substantially immiscible with both fluid 62 and 64. For example, if the liquid 60 is a hydrophobic, then the fluid 62 and the fluid 64 can be hydrophilic liquids. In typical supported liquid membrane systems such as described in the following examples, the second fluid 60 consists essentially of light oils, and the first fluid 62 and third fluid 64 are aqueous solutions.

As shown in FIGS. 1-3, the pores 22, 32 and 42 are substantially cylindrical cavities extending through their respective layers 20, 30, and 40. Although such cylindrical construction simplifies theoretical calculations to determine effective mass transport rates at predetermined fluid oscillation frequencies, it is not necessary that the pores 22, 32, and 42 be cylindrical passageways of uniform dimensions. Suitable pores can also be formed from bundled capillary tubes, beads rigidly maintained in association with each other, microporous polypropylene films, glass frits and stainless steel screening, or any other rigid, solid structure having passageways of suitable dimensions that permit fluid communication between opposite sides of the structure.

Preferred average pore diameters (D) for pores 32 and 42 of the first and third layers range from about 5 micrometers to about 50 micrometers. The pores 32 and 42 can have circular, ellipsoidal, polygonal, or irregular cross sections. The length (L) of the pores 32 and 42 preferably ranges from about 50 micrometers to about 1000 micrometers. This can be a straight passageway through the first and third layers 30 and 40, or can be a winding or tortuous path. In addition, pores can divide into multiple passageways through layers 30 and 40. This configuration is commonly found in those embodiments consisting of packed glass beads or other rigidly positioned pellets.

The optimal diameter (D) and length (L) of Pores 32 and 42 depends upon the diffusion constant in the liquid 60 of the chemical species 70 to be be transported across the supported liquid membrane 12 and can be experimentally or theoretically determined as described below and in the following examples. A uniform pore diameter (D) for all of the pores 32 and 42 in the first and third layers is not required, but since enhancement in mass transport through oscillating supported membranes is dependent on the square of the radius of the pores, in practice mass transport through the largest pores will dominate mass transport through smaller pores.

Preferred average pore diameters (d) for pores 22 in the second layer 20 range from about 0.5 micrometers to about 5 micrometers. The pores 22 of the second layer 20 can also have circular, ellipsoidal, polygonal, or irregular cross sections. The length (l) of the pores 22 preferably ranges from about 1.0 micrometers to about 10 micrometers. As with the pores 32 and 42, this can be a straight passageway through the second layer 20, or can be a winding or tortuous path through that layer 20. Pores can divide into multiple passageways through the second layer 20, such as in embodiments consisting of packed glass beads or other rigidly positioned pellets.

The optimal diameter (d) and length (l) of the pores 22 depends upon the amount of pressure applied traverse to a supported liquid membrane 12 by the fluids 62 or 64. To prevent expulsion of the liquid 60 from the pores 22 and consequent breakup of the supported liquid membrane 12, the pressure difference between the fluids 62 and 64 should not exceed the capillary pressure in the pores 22 due to attractive forces between the liquid 60 and pore walls 23 of the pores 22. Thus, in order to stabilize the liquid 60 in the pores 22, 32, and 42, the average diameter of the pores 22 must be less than the diameter of the pores 32 and 42. Generally, the diameter of the pores 22 is selected to range from about one-half to about one-twentieth the diameter of the pores 32 and 42 and the length of the pores 22 is selected to be less than one-half the length of the pores 32 and 42. A uniform pore diameter (d) for all of the pores 22 is not required, but to prevent expulsion of liquid 60, all of the pores 22 in the second layer 20 should be constructed to have a sufficiently small diameter to maintain a capillary pressure greater than any transient pressure difference.

To maximize the overall mass transport rate of chemical species 70 through the supported liquid membrane 12 the diameter (d) of the pores 22 should be maximized and the length (l) minimized to the extent permitted by the expected cyclic pressure differential between the fluids 62 and 64 induced to promote oscillation of liquid 60 within the heterogeneous support 10. Constructing the support 10 with the relative dimensions between pores 22, 32, and 44 as described above generally enables formation of a stable liquid membrane 12 under typical transient pressure differentials encountered in operation. The exact pore dimensions for practical applications can be experimentally or theoretically determined as described in the following examples.

Inducing reversible laminar flow of the liquid 60 through the pores 22, 32, and 42 of the support 10 can be accomplished by varying the pressure differential between the fluids 62 and 64 in a cyclic or oscillatory manner. If the support 10 is movable, this cyclic pressure variation can be established by mechanical oscillatory motion of the support 10 itself. Alternatively, inducing laminar flow of the liquid 60 could be achieved if the liquid 60 is a ferrofluid subject to oscillatory flow in an alternately reversing electromagnetic field. Other methods of inducing fluid flow within the pores 22, 32, and 42 known to those skilled in the art can also be used as desired.

In operation, the supported liquid membrane 12 can be used to separate an impure solution of chemical species 70 and 72 present in the fluid 62. The fluid 62 is contained in the chamber 80, and is separated from the chamber 82 by the supported liquid membrane 12. A pressure differential is induced between the fluids 62 and 64. In FIG. 2, the gradient of the pressure differential, going from high pressure to low pressure, is indicated by the direction of the arrow. Since the fluid 62 transiently has a greater pressure than the fluid 64, the fluid 62 can flow into the pores 42, overcoming the relatively small resisting capillary pressure of the pores 42. As the liquid 62 displaces the liquid 60 from the pore 42, the liquid 60 formerly present in the pore 42 smoothly flows in a laminar flow regime through the pores 22 and into the pores 32, where it displaces any fluid 64 present in the pores 32. Once the fluid 62 completely filled the pore 42, further expulsion of the liquid 60 from the pore 22 is resisted by the high capillary pressure of the liquid 60 in the pores 22, as shown in FIG. 2. In effect, the pores 22 provide a pressure tolerant barrier that prevents separation of the liquid 60 forming the liquid membrane 12 from the support 10.

As shown in FIG. 3, the direction of flow of liquid 60 can be reversed as the pressure differential gradient between the fluids 62 and 64 is reversed. The fluid 64 transiently has a greater pressure than the fluid 62, allowing the fluid 64 to flow into the pores 42. As the liquid 64 fills the pore 32, the liquid 60 was displaced from the pore 42, and smoothly flowed in a laminar flow regime through the pores 22 and into the pores 42. Once the fluid 64 completely filled the pore 32, further expulsion of the liquid 60 from the pore 22 is again resisted by the high capillary pressure of the liquid 60 in the pores 22.

Separation of the chemical species 70 from the chemical species 72 occurs as a result of this reversible laminar flow of the liquid 60 through the pores 32 and 42. In the apparatus shown in FIGS. 2 and 3, the separation process occurs as a consequence of the interaction between the rate of diffusion of the chemical species 70 in the pores 32 and 42 and the dispersion of the solute species across the pores 22, 32, and 42 as a result of laminar flow of the liquid 60. On the average, chemical species 70 entering the liquid 60 from the fluid 62 are consecutively transported across the length of the pores 42, 22, and 32 by the laminar flow of the liquid 60 during the first half of the oscillation cycle. On the average however, the radial diffusion of the chemical species 70 from the center of the pores 32 and 42 to the pore walls 33 or 43 takes about as long as half of one oscillation cycle. When the direction of laminar flow of liquid 60 reverses, the chemical species 60 tends not to move backward to their entry point in the pore 42 as quickly, since the velocity of laminar flow of the liquid near the pore walls 43, 23, and 33 is much less than the velocity of laminar flow near the center of the pores. The chemical species 70 tends to remain in the pore 32, giving it a better chance of diffusing out into the fluid 64. Although the movement of the chemical species 70 is of course reversible, if the concentration of species 70 is maintained at a lower level than its concentration in the fluid 62 the net mass transport will be from the fluid 62 to the fluid 64.

The operation is useful for separations because the quickly diffusing chemical species 72 will not experience an enhancement in mass transport rates. Because the species 72 has a high radial diffusion rate, it can on the average move back and forth between the center of the pore and the pore walls 33 and 43 many times during the course of a single oscillation, making the average mass transport rate through the liquid 60 essentially no different than that provided by simple diffusion.

The parameters determining the rate of mass transport of the chemical species 70 and 72 in the foregoing operation can be appreciated with reference to the following theoretical analysis of mass transport within pores 32 and 42. The adjustments required to account for diffusive transport through the pores 22 will be described in Example 1.

For chemical species 70 and 72 present in pores 32 and 42, the degree of enhancement of mass transport is proportional to the square of the dimensionless tidal displacement ($\Delta x/a$), where a is one-half the diameter (D) and $\Delta x$ is the tidal displacement along the axial length (L) of the pore. The tidal displacement resulting from an oscillatory pressure gradient across the length of the pore can be determined from Poiseuille's Law to scale proportional to $a^2$. As a consequence, the contribution of each size of pore will also scale as $(\Delta x/a)^2 \sim (a^2/a)^2 \sim a^2$ times the area occupied by pores of that size.

The degree of enhancement of mass transport is a monotonically increasing function of the frequency of the oscillation. A dimensionless frequency $\beta$ can be defined as:

$$\beta = (2fa^2/D_o)^{\frac{1}{2}} \quad (1)$$

Where f is the frequency of oscillation, $D_o$ is the molecular diffusivity, and $\beta$ is the dimensionless frequency of oscillation.

Figure 5:
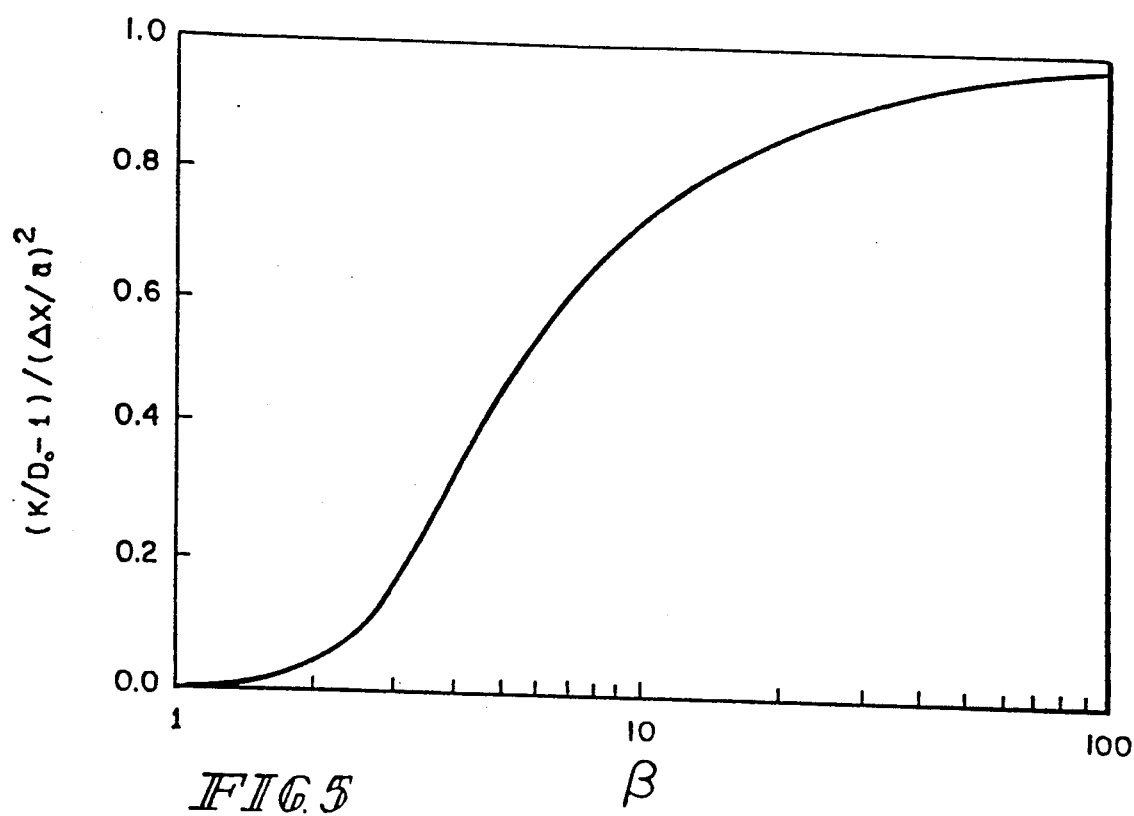
FIG. 5 is a graph illustrating the degree of enhancement of mass transport as a function of the dimensionless frequency of oscillation of the liquid membrane.

The degree of augmentation shown approaches a maximum for large $\beta$ and vanishes rapidly for small $\beta$. This is graphically demonstrated in FIG. 5, which shows the degree of enhancement in mass transport as a function of $\beta$.

For a fixed frequency f and pore radius a the degree of enhancement of mass transport is a function of molecular diffusivity $D_o$, with the mass transport being augmented to a greater degree for those molecules having a low diffusivity. Molecules having a high diffusivity, for which $\beta$ is much less than 1, receive essentially no augmentation in mass transport since they diffuse across the width of the pores of the supported membrane during a time which is much shorter than the period of oscillation, and thus simply move back and forth in the tube with the average velocity of the fluid.

Figure 6:
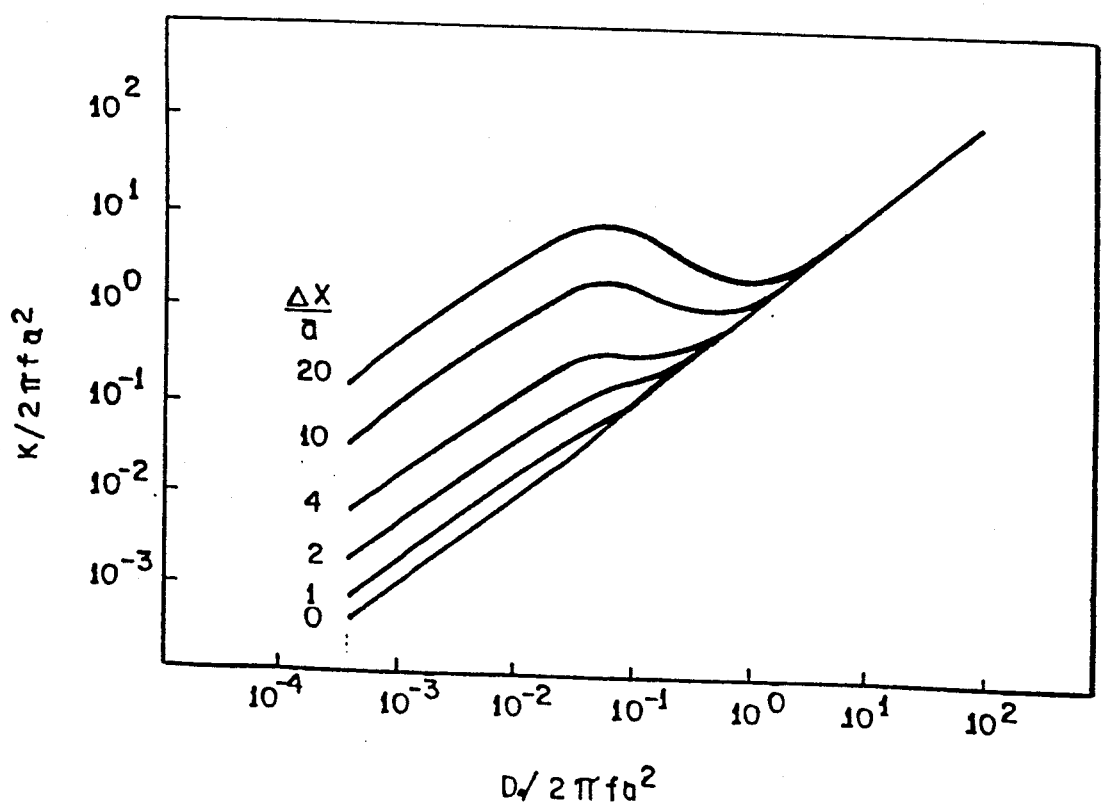
FIG. 6 is a graph illustrating the non-linear augmentation of mass transport rates for molecular species having various diffusivity constants.

As shown in FIG. 6, a surprising result occurs in the family of curves exhibiting a maximal tidal displacement ($\beta x/a$) greater than about 4. Because the mass transport enhancement curves are non-linear, it is possible to cause a large, slowly diffusing molecule to travel across a supported liquid membrane faster than a smaller molecule having a higher diffusion coefficient. For example, if the tidal displacement ($\Delta x/a$) is 10, a solute species with a dimensionless molecular diffusivity of $10^{-1}$ will experience a two-fold enhancement in the rate of mass transport, while a molecule having a molecular diffusivity 10 times greater will experience no enhancement in mass transport. The net result will be that the larger molecule will have a higher enhanced molecular diffusivity by a factor of 2. Within the physical limits imposed by the need to maintain the integrity of the support structure and prevent separation of the membrane-forming liquid from that structure, the degree of enhancement of mass transport can be further increased by increases in the tidal displacement ($\Delta x/a$).

Additionally, varying the dimensionless frequency $\beta$ through modification of the frequency of oscillation for the pore diameter D allows the selection of the maximum enhanced mass transport at any desired value of molecular diffusivity. The frequency of oscillation can be adjusted to cause enhancement of mass transport of large molecular complexes without significant increase in the mass transport across the liquid membrane of the solvent. This permits the use of facilitated transport systems in which solutes bind with carrier species, greatly increasing the concentration of the solute and the selectivity of supported liquid membranes.

A typical supported liquid membrane 12 should be capable of withstanding a tidal oscillation ($\Delta x/a$) on the order of 10. To ensure membrane stability, the axial dimension of the pores of the membrane should be greater than $\Delta x$, also on the order of 10 or more.

Other aspects of the present invention are further described with reference to the following examples:

EXAMPLE 1

Design of a heterogeneous supported liquid membrane 12 requires consideration of the following variables. The heterogeneous support 10 shown in FIGS. 1-3 consists of first and third layers 30 and 40 having a uniform cylindrical pore structure of porosity $\epsilon$, pore radius a (equal to $\frac{1}{2}$ D) and length L. A thin second layer 20 of microporous material is sandwiched between the two layers 30 and 40 in the interior of the support 10. The layer 20 has a uniform cylindrical pore structure of porosity $\epsilon_i$, pore radius $a_i$ and length l. When the layer 20 and the first and second layers 30 and 40 are permeated with the liquid 60, the layer 20 of the supported liquid membrane forms a capillary pressure barrier against rupture when subjected to oscillatory pressure variations.

The dimensionless mass transfer coefficient h, produced by the oscillatory liquid membrane described above is a function of the dimensionless frequency of oscillation $\beta$, the dimensionless tidal displacement $\Delta x/a$ and the aspect ratio of a/L. In order to maximize the mass transfer coefficient h, the tidal displacement $\Delta x$ is required to be as close as possible to the length l of the pores in the outer porous layers 30 and 40. The tidal displacement cannot of course exceed this value, and any smaller displacement would lower the mass transfer coefficient. The maximum dimensionless mass transfer coefficient thus depends solely on a/L and $\beta$.

For a sinusoidal pressure drop and tidal displacement the mass transfer coefficient produced by the membrane will be given by:

$$h = \frac{D_o}{L}\left(1 + \left(\frac{L}{a}\right)^2 f(\beta)\right)$$

where $f(\beta)$ is given by:

$$f(\beta) = \left(1 - \frac{4T_3(\beta)}{(\beta)T_2(\beta)}\right)$$

The functions $T_2(\beta)$ and $T_3(\beta)$ are defined as:

$$T_2(\zeta) = (ber')2(\zeta) - (bei')2(\zeta)$$

$$T_3(\zeta) = ber(\zeta) ber'(\zeta) - bei(\zeta) bei'(\zeta)$$

where the functions ber($\zeta$) and bei($\zeta$) are Kelvin functions related to the Bessel function $I_o$ by $I_o(\zeta i)^{1/8} = ber(\zeta) + bei(\zeta)$. The function $f(\beta)$ approaches 1 as $(\beta) \to \infty$ and vanishes as $(\beta) \to 0$.

Because of the nonlinear dependence of the enhancement of mass transport on tidal displacement, the absolute mass transfer coefficient h is actually greater for larger L. The mass transfer coefficient h thus improves as both L/a and $(\beta)$ become large. Unfortunately, as L/a and $(\beta)$ increase, so does the fluid velocity and the pressure drop. The condition that the maximum pressure drop be less than the capillary pressure of the central barrier thus leads to a limit on the maximum possible mass transfer coefficient for a sinusoidally oscillated heterogeneous liquid membrane.

The limiting behavior can be calculated from the Hagen-Poiseuille relation for a laminar flow through a tube where the space average velocity $<u>$ is related to the pressure gradient $\partial p/\partial z$ by:

$$<u> = (-1/8)\left(\frac{a^2}{\mu}\right)\left(\frac{\partial p}{\partial z}\right)$$

Assuming a sinusoidal variation in the imposed pressure gradient and velocity, the maximum velocity can be defined in terms of the time average velocity $<<u>>_{time\ avg}$ averaged over one half of a period of oscillation and the angular frequency $\omega$:

$$<u>_{max} = \left(\frac{\pi}{2}\right)<<u>>_{time\ avg}$$

$$\frac{<u>_{max}}{\pi L} = \frac{\omega}{\pi} = \frac{<<u>>_{time\ average}}{L}$$

The maximum velocity can be rewritten in terms of the dimensionless frequency $(\beta)$:

$$<u>_{max} = \left(\frac{\omega L}{2}\right) = \left(\frac{D_o L}{2a^2}\right)\beta^2$$

where $D_o$ is the molecular diffusivity.

The maximum pressure drop $\Delta p_o$ across the first and third layers 30 and 40 is thus given by:

$$\Delta p_o = \left(\frac{4\mu D_o L^2}{a^4}\right)\beta^2$$

where we have neglected the pressure drop of the fluid other than the membrane fluid. This is reasonable because the membrane fluid is typically much more viscous than the surrounding fluid, and the additional pressure drop would not qualitatively change the results.

In addition to this pressure drop we also have a contribution from layer 20. Assuming that Poiseuille flow occurs in this region as well, we have:

$$\Delta p_i = \left(\frac{\mu D_o L L_i}{a_i^2 a^2 \epsilon_i}\right)\beta^2$$

The total pressure drop is given by:

$$\Delta p = \Delta p_o + \Delta p_i = \frac{4\mu DL^2}{a^4}\beta^2\left(1 + \frac{L_i a^2}{L a_i^2 \epsilon_i}\right)$$

The capillary pressure drop is given by:

$$\Delta p_{cap.} = \left(\frac{2\sigma}{a^i}\right)$$

where $\sigma$ is the surface tension and $a_i$ is the pore radius of the inner layer.

In order for the membrane to be stable the maximum pressure drop should be be less than capillary pressure. The ratio of these pressures is given by:

$$\gamma = \frac{\Delta}{\Delta p_{cap.}} = \left(\frac{2\mu D}{Q}\right)\left(\frac{a_i L^2}{a^4}\right)(\beta^2)(1 + \eta)$$

where $$\eta = \left(\frac{L_i a^2}{L a_i^2 \epsilon_i}\right)$$

and is the relative resistance to flow provided by the central barrier.

We may recognize two limiting cases: Case 1, where $\eta >> 1$ and the resistance to flow is dominated by the central layer, and Case 2, where $\eta << 1$ and the resistance is primarily in the outer layers.

For $\eta >> 1$ we have, approximately, that:

$$\gamma = \frac{\Delta p}{\Delta p_{cap.}} = \left(\frac{2\mu D_o L_i L}{\sigma \epsilon_i a^2 a_i}\right)(\beta^2)$$

and hence the limiting value of the mass transfer coefficient is given by:

$$f(\beta)_{h1} = \epsilon\left(\frac{D_o}{L}\right)\left(\frac{L^2}{a^2}\right)f(\beta) =$$

$$\left(\frac{a_i \sigma \epsilon \epsilon_i}{2 L_i \mu}\right)\left(\frac{\Delta p}{\Delta p_{cap}}\right)\left(\frac{\ }{\beta^2}\right)$$

provided $(L/a)^2 f\beta >> 1.0$.

For $\eta << 1$ the pressure drop is given by:

$$\gamma = \frac{\Delta p}{\Delta p_{cap.}} = \left(\frac{2\mu D a_i L^2}{\sigma a^4}\right)(\beta^2)$$

and hence the limiting mass transfer coefficient is given by:

$$h_2 = \epsilon \left( \frac{D_o \sigma}{2\mu a^i} \frac{\Delta p}{\Delta p_{cap}} \right)^{\frac{1}{2}} \left( \frac{f(\beta)}{\beta} \right)$$

again provided $(L/a)^2 f(\beta) >> 1.0$.

Figure 8:
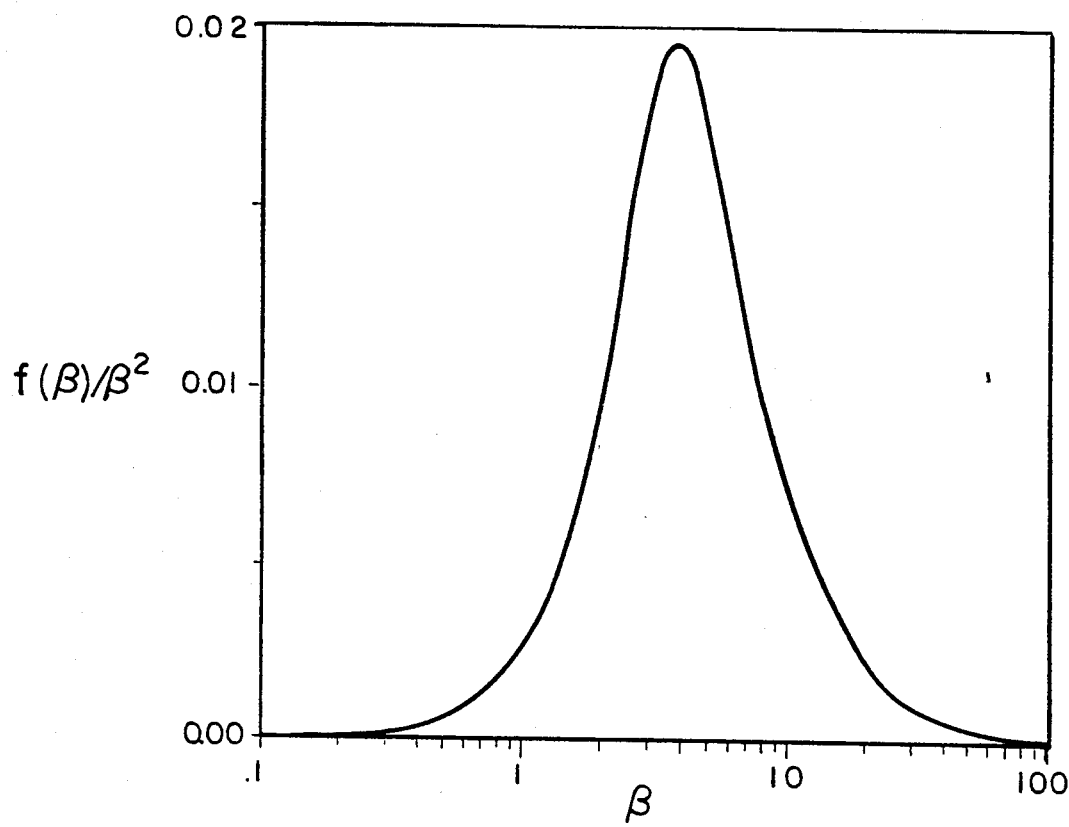
FIGS. 8 and 9 show the graphs of $f(\beta)/\beta^2$ and $f(\beta)/\beta$ vs the dimensionless frequency of oscillation $\beta$, illustrating the sharply peaked functions resulting in a maximum in both $f(\beta)/\beta^2$ and $f(\beta)/\beta$.
Figure 9:
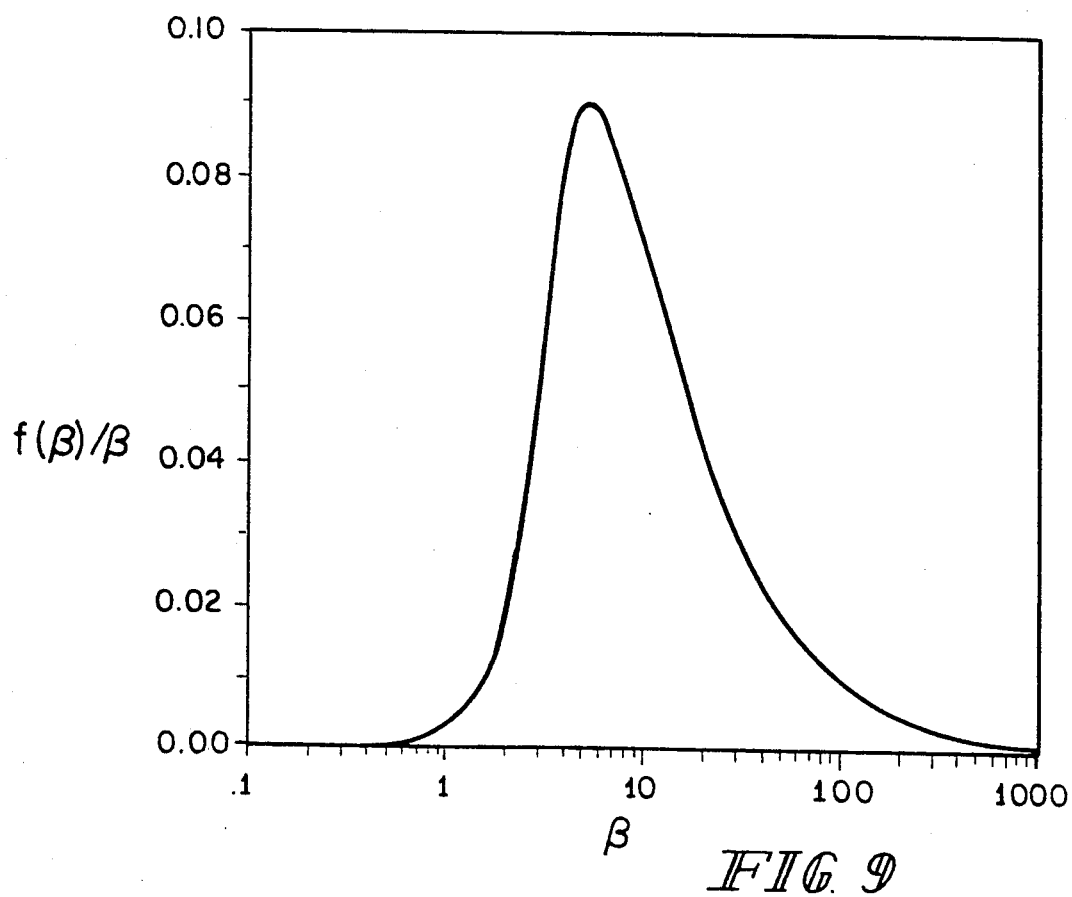

FIG. 8 and FIG. 9 show the graphs of $f(\beta)/\beta^2$ and $f(\beta)/\beta$ vs the dimensionless frequency of oscillation $\beta$. Both the graphs describe sharply peaked functions resulting in a maximum in both $f(\beta)/\beta^2$ and $f(\beta)/\beta$.

For both Case 1 and Case 2 the limiting mass transfer coefficients $h_1$ and $h_2$ are independent of a and L. For most choices of membrane parameters $\eta > 1$ and hence the central inner layer will provide the majority of the resistance to fluid flow.

The limiting value of the mass transfer coefficient can be calculated for the case when resistance to flow is dominated by the middle region. For purposes of estimation one can assume the following parameters.

a) Choose $\epsilon_i$, $a_i$, and $L_i$ to correspond to a typical nucleopore membrane.

$\epsilon_i = 0.16$, $a_i = 0.5$ μm, and $L_i = 10$ μm b) $\sigma = 50$ dynes/cm (light oil and water)
c) $\mu = 0.1$ p (light oil)

d) $\dfrac{f(\beta)}{\beta^2} = 0.02$ (the maximum value from FIG. 8.)

e) $\epsilon = 0.8$.

f) $\dfrac{\Delta p}{\Delta p_{cap.}} = 0.5$

The maximum value of $h_1$ estimated from these parameters is 0.016 cm/sec. This limiting value of the mass transfer coefficient is independent of the diffusivity D. We may now calculate the values of L, a, and $\omega$ for which this mass transfer coefficient may be achieved. Recall that, $$h = \frac{\epsilon D_o L}{a^2} f(\beta) \quad \text{for} \quad \frac{L^2}{a^2} >> 1.0$$

hence $$\omega L = \frac{h \beta^2}{\epsilon f(\beta)}$$

or, at the optimum conditions, $\omega L = 1$ cm/sec.

From FIG. 8 we find that the function $f(\beta)/\beta^2$ reaches its maximum value at $\beta^2 = 15.2$ to obtain:

$$\frac{D_o L}{a^2} = \left( \frac{D_o}{\omega a^2} \right)(\omega L) = 0.066 \text{ cm/sec}$$

For a given diffusivity and pore radius there is an optimum length L. If we take $D = 10^{-7}$ cm$^2$/sec (a typical value for a low molecular protein in a light oil) and take $a = 5$ μm, then the optimum thickness is 0.16 cm. Note that the value of $\eta$ corresponding to these values of a and L is $\eta = 3.8$, which is comfortably greater than one had been assumed.

The membrane parameters calculated above correspond to an effective liquid film only 0.06 μm thick. An effective film thickness this small results in a 30,000 fold enhancement in mass transport if the membrane is stable. If we reduce L, the outer layer thickness, to a more reasonable value of 500 μm, then the enhancement will be reduced by an order of magnitude, the effective film thickness will still be only 0.2 μm, and the ratio of $\Delta p/\Delta p_{cap}$ will be 0.16, rendering the membrane very stable.

EXAMPLE 2

A heterogeneous support that includes of two $\frac{1}{8}$ inch polymethylmethacrylate sheets pierced by 660 μm holes, with a total void fraction of 0.2, was constructed. Sandwiched between these two outer supports was a hydrophobic central section of polypropylene monofilament screening fabric of 74 μm mesh size and 22% open area. The heterogeneous liquid membrane support was half filled with a light isoparaffinic solvent Exxon S100N, giving an aspect ratio of the membrane fluid in the pores of 0.10. Oscillation of the fluid in the pores was provided with an oscillatory syringe pump and the mass transfer was observed as the function of frequency and stroke volume.

Figure 7:
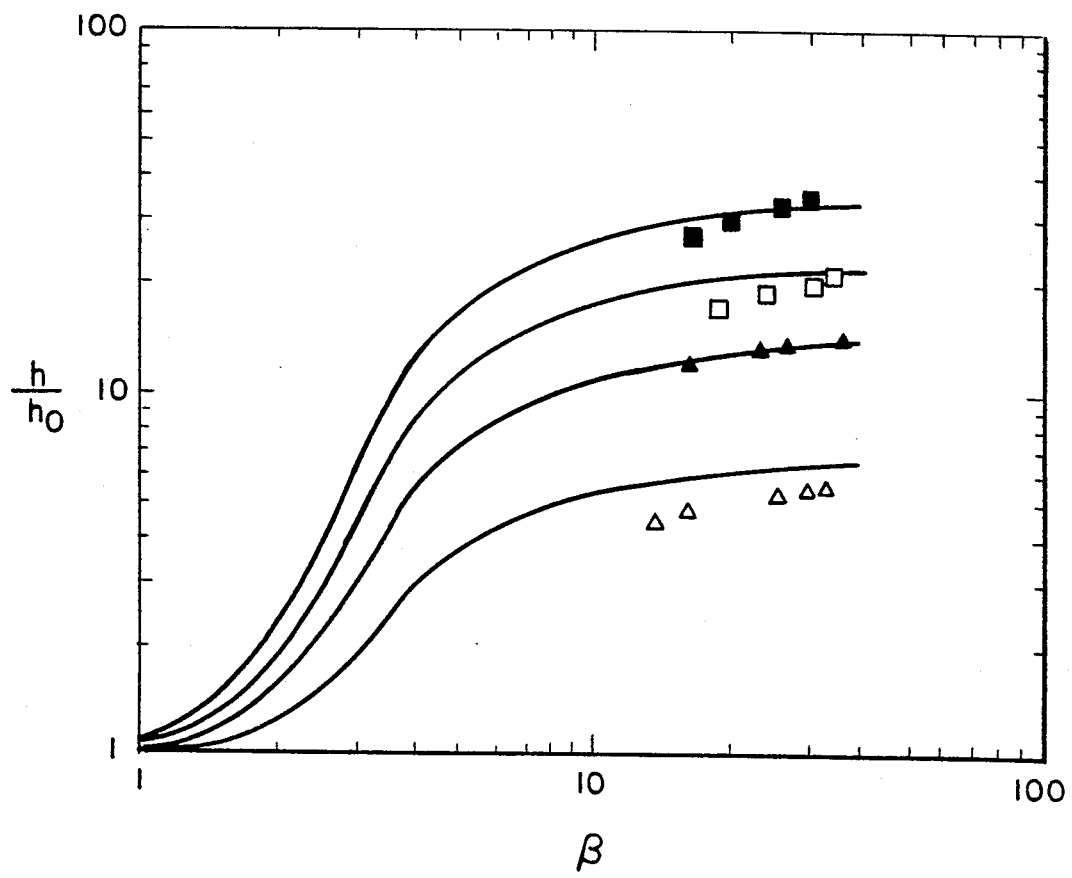
FIG. 7 is a comparison of the theoretically calculated to the experimentally derived enhancement of mass transport through a supported liquid membrane described in Example 2.

The mass transfer enhancement in the uniform support closely corresponded to theoretical estimates such as previously described in Example 1. FIG. 7 compares the measured enhancement in mass transport $h/h_o$ to the theoretical estimates (solid lines) with no adjustable parameters. Experimental results are indicated by solid and unfilled squares, and solid and unfilled triangles, that respectively correspond to strokes volumes of 140, 114, 88, and 58 microliters in a syringe pump apparatus described in Example 3. As is apparent from FIG. 7, the largest enhancement in mass transport rate observed corresponds to an effective liquid membrane thickness of less than 1/6 of the pore diameter.

EXAMPLE 3

Figure 4:
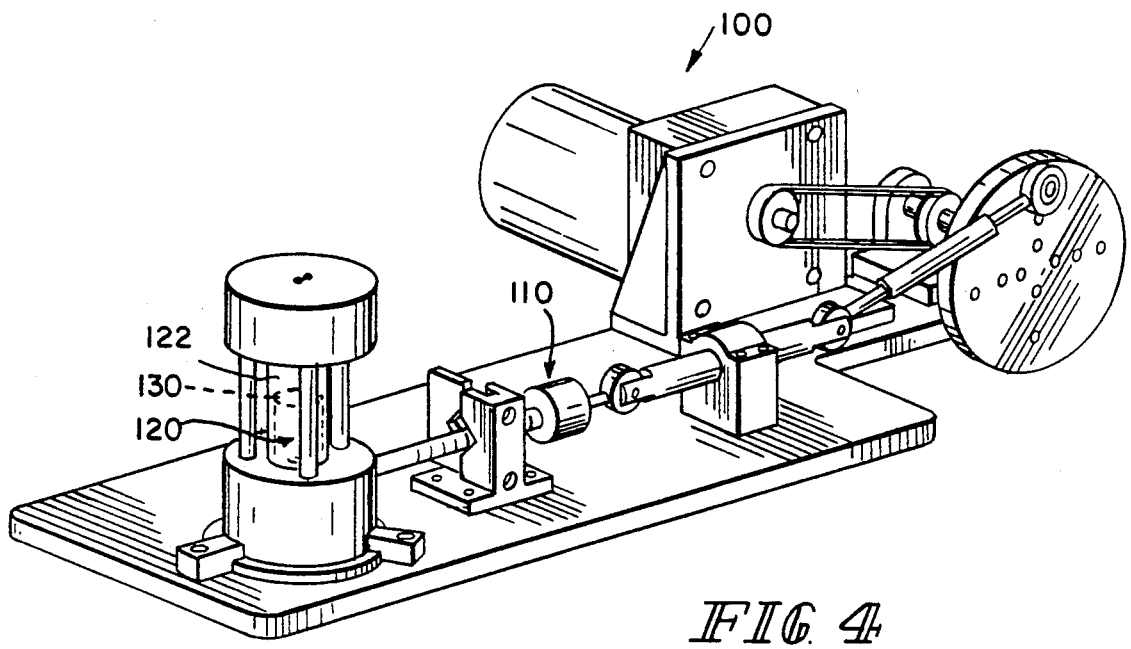
FIG. 4 is a perspective view of an apparatus for oscillating liquid contained in the heterogeneous supported liquid membrane.

An apparatus 100 for enhancing mass transfer of solutes such as shown in FIG. 4 can be constructed. The apparatus 100 includes an oscillating piston-in-cylinder (syringe) pump 110 coupled to a first chamber 120 separated by a heterogeneous support 130 from a second chamber 122. The heterogeneous support 130 can be formed from two coarse glass frits that have a polypropylene microporous filter inserted therebetween. Half of the pore space volume of the heterogenous support 130 can be impregnated with Exxon S100N, a light isoparaffinic solvent. Impregnation of the heterogeneous support with this light oil can be accomplished by rendering the pores of the heterogeneous support 130 hydrophobic by spraying it with Scotchguard ®. This material is a solution of a fluoraliphatic resin in 1,1,1-trichloroethane driven by a propellent. The material can be sprayed onto the surface of the heterogeneous support, then drawn through to coat the pores extending therethrough by vacuum. If the heterogeneous support 130 were not rendered hydrophobic, then the oil membrane phase would be displaced from the support 130 upon contact with water. Impregnation with the light oil into the heterogeneous support 130 can similarly be accomplished by drawing the oil through the glass frit with vacuum. Excess oil can be poured off.

The transport of phenol contained in an aqueous solution from the first chamber 120 across the membrane into an aqueous solution in the second chamber 122 can be evaluated. Phenol has a reported diffusivity of $0.65 \times 10^{-6}$ cm$^2$/s in the oil phase and a partition coefficient of 0.52 between the aqueous and oil phases. The first chamber 120 can be filled with a 1% solution of phenol and the second chamber can be filled with distilled water. Green dye can be added to the solution to reveal the presence of any defects in the membrane during operation. Care must be taken to eliminate all air from the lower chamber and to ensure that operation of the pump 110 results in displacement of the fluid in the heterogeneous support 130.

During operation of the pump 110, samples of the water in the second chamber 122 can be analyzed for phenol concentration using a gas chromatograph. The instrument should be calibrated with measurements of the phenol concentration used in the first chamber 120, to minimize possible sources of error. Concentration measurements should be taken in the second chamber 122 periodically throughout the experiment to determine the rate of change of the concentration.

The mass transport across the membrane both with and without the oscillation should provide a linear increase in phenol concentration with time on the collection side. The enhancement in the transport rate across the membrane due to oscillation should be substantial however, generally being at least 30 to greater than 200 times the mass transport rate without oscillation.

EXAMPLE 4

Waste Water Treatment

It is often necessary to treat effluent from chemical plants to remove large quantities of toxic materials before discharging the effluent stream into conventional waste treatment facilities. In this example we consider the performance of a model oscillatory membrane for the recovery of phenol from a waste stream. For design purposes, consider a plant which discharges a 10% phenol solution at a rate of 1000 liters/hr. To recycle this phenol and to reduce its concentration to the point where conventional biological digestion of the phenol can occur, it is necessary to remove 99% of the phenol via a supported oscillatory liquid membrane process.

In this case, the phenol is diffused across a liquid membrane from the waste stream into a collection phase containing concentrated NaOH. This basic solution reacts with the phenol and acts to reduce the phenol concentration on the collection side to zero. The liquid membrane support is a laminate of three porous layers having pores in fluid communication with each other, with an inner porous layer sandwiched between two outer porous layers. The outer porous layers respectively have a length L of 500 micrometers, an average pore radius a of 10 micrometers, and a porosity of $\epsilon = 0.5$. The inner layer length l of the pores is 10 micrometers, with a pore radius $a_i$ of 1 micrometer and a porosity of $\epsilon_i = 0.16$. The liquid supported by the trilayer membrane is light oil Exxon S100N with a viscosity of 44 cp. The diffusivity of phenol in this oil is $0.65 \times 10^{-6}$ cm$^2$/s, and the oil/water partition coefficient is $\alpha = 0.52$. A tidal displacement of $\Delta x/L = 1.0$ is selected, driven by oscillating pressure differential that has a maximum of about $1.4 \times 10^5$ dynes/cm$^2$ (0.13 atmospheres). At an oscillation frequency of 1.6 Hz (angular frequency of 9.88 radians/sec) augmentation in transport of a factor of 770 is achieved, corresponding to an effective membrane thickness of 0.65 micrometers.

The total transport rate of phenol achieved by this oscillatory membrane is given by:

$$N_{phenol} = \alpha D_o \epsilon \Delta c / L_{eff}$$

where $\alpha$ is the oil/water partition coefficient, $D_o$ is the molecular diffusivity, $L_{eff}$ is the effective pore length (the actual pore length divided by the degree of augmentation, in this example 0.65 micrometers)), $\epsilon$ is the porosity, and $\Delta c$ is the concentration differential of phenol across the membrane. The total area of membrane required to remove 99% of the phenol from a waste stream with flow rate $Q = 1000$ l/hr is given by:

$$Area = (\log(100) L_{eff} / \alpha D_o \epsilon) Q = 45 \ m^2$$

The liquid membrane requires only about 10 kg of the light oil in total, as compared with a phenol recovery of nearly 100 kg/hr.

EXAMPLE 5

Concentration of an Amino Acid

Amino acids are often used directly in various nutritional supplements as well as for reactants in the manufacture of other synthetic chemicals. A desirable method of synthesis of amino acids is through biochemical means because certain bacteria can be genetically altered to produce the correct isomer as their sole product. (Chemical synthesis methods usually produce a racemic mixture.) The greatest difficulty which arises when amino acids are produced by living organisms is the recovery of the product from the fermentation broth in a sufficiently concentrated form for further processing. This concentration step can be done using the present oscillatory liquid membrane process.

A carrier-facilitated counter-transport process, such as has been suggested for emulsified surfactant liquid membranes, is used. In this process chloride (Cl$^-$) will be transported down its concentration gradient, driving the transport of an amino acid (phenylalanine in this example) in the opposite direction. If the gradient of Cl$^-$ is larger than the corresponding gradient in phenylalanine, the phenylalanine can, in theory, actually be transported against its concentration gradient and thereby obtained at a higher concentration. The carrier needed for this counter transport process is a quaternary ammonium salt (tricaprylylmethylammonium chloride). The chloride ions may be obtained from a 2M aqueous potassium chloride solution on the collection side of the liquid membrane, and into which the phenylalanine is to be concentrated. For design purposes, consider the extraction of amino acid from 1000 liters of a fermentation broth which contains 1.7% phenylalanine by weight. A liquid membrane support such as described in Example 4 can be prepared. The liquid membrane support is filled with Exxon S100N oil with a carrier concentration of $10^{-2}$M. The diffusivity of the amino acid-ammonium salt complex concentration across the membrane will be approximately half the carrier concentration since all of the salt will be complexed with either the amino acid or chloride ion. A tidal displacement of $\Delta x/L = 1.0$ is selected, driven by oscillating pressure differential that has a maximum of about 0.13 atmospheres. At an angular oscillation frequency of 3.7 radians/sec an augmentation in transport of a factor of 750 is achieved, yielding an effective membrane thickness of 0.65 $\mu$m. Approximately 95% of the phenylalanine can be extracted from a batch of 1000 liters in a device with an area of about 360 m$^2$ in a period of 1 hour. A smaller separation device with a lower phenylalanine flux can be used. Alternatively, several reactors could be used to feed the one oscillatory liquid membrane separator.

The use of an oscillatory liquid membrane system can reduce a problem which has arisen in the use of emulsion liquid membranes for concentrating phenylalanine. In standard liquid membrane systems, water will diffuse due to the gradient in salt concentration, and is transferred across the membrane at a rate sufficient to dilute the product even though it has a very low solubility in the oil. This occurs due to the high diffusivity of the water molecules, which is about $2 \times 10^{-6}$ cm$^2$/sec, or an order of magnitude greater than the phenylalanine-ammonium salt complex. In an oscillatory liquid membrane, however, the degree of enhancement of the transport rate is a function of the dimensionless frequency $\beta = (2\ fa^2/D_o)^{1/8}$ where f is the frequency of oscillation, a is the pore radius and $D_o$ is the molecular diffusivity, and hence the enhancement will be different for different species. In this case the diffusivity of water is augmented by only a factor of about 16, resulting in an effective membrane thickness for water of 31 $\mu$m. The oscillation of the fluid in the membrane thus not only increases the transport rate of phenylalanine by a factor of 750, but also increases its selectivity by a factor of 47 and making it possible to actually concentrate the amino acid.

EXAMPLE 6

Recovery of a Toxic Metal from an Aqueous Solution

Plating operations often produce wastewater streams which contain toxic heavy metal ions, such as $Cr^{6+}$. It is not safe to discharge these streams into the environment. In addition, it is desirable to recover the metal ion in a form suitable for re-use. Emulsion liquid membranes have been proposed for this purpose and a plant utilizing that technology is now in operation in Australia. The present oscillatory liquid membrane process can be used here as well.

A carrier facilitated transport system is used. In this case an appropriate carrier is a $C_8$–$C_{10}$ tertiary amine. The pH of the wastewater phase is adjusted to 3.5. The other phase will be basic, a 10% NaOH solution which will regenerate the amine. Until the OH$^-$ ions are depleted, the chromium ions are effectively "trapped" in the second phase because they cannot compete successfully with OH$^-$ for amine which would allow them to reenter the membrane. The membrane support is constructed to have the same physical characteristics as described in Example 4. Exxon S100N with 10% by weight of the carrier added is the working fluid. The diffusivity of the chromium-amine complex in this oil is expected to be about $0.4 \times 10^{-6}$ cm$^2$/s. The concentration change of the chromium-amine complex across the membrane can be taken as $\frac{1}{2}$ the carrier molar concentration. A tidal displacement of $\Delta x/L = 1.0$ is selected, driven by oscillating pressure differential that has a maximum of about 0.08 atmospheres. At an angular oscillation frequency of 6.1 radians/sec an augmentation in transport of a factor of 750 is achieved, yielding an effective membrane thickness of 0.65 $\mu$m. Removal of 95% of the chromium from 1000 liters/hour of a 400 PPM $Cr^{6+}$ stream in water is accomplished with effective membrane area of about 2.3 m$^2$.

EXAMPLE 7

Separation of Gases

In many important industrial processes it is necessary or desirable to separate gases. Examples of this include the removal of hydrogen sulfide from coal gases in alternative energy systems and the production of oxygen enriched air for breathing assistance apparatus. Supported liquid membranes have been suggested as a means of achieving these separations. The separation of nitric oxide from argon is here considered using an oscillating liquid membrane composed of a ferrous chloride solution in formamide. A high flux of nitric oxide is achieved in this system because NO reversibly reacts with the $Fe^{2+}$ ion, greatly increasing its solubility in the formamide. This is another example of facilitated transport in liquid membranes.

A 50% mole fraction mixture of nitric oxide and argon at 2 atm are separated from a collection phase (in which the nitric oxide undergoes an irreversible reaction, reducing its concentration to zero) by a 1 mm thick porous support containing a 0.05M ferrous chloride solution in formamide. This liquid membrane phase has a viscosity of 3.3 cp at 25° C., and the $Fe^{2+}$ and $FeNO^{2+}$ ions both have a diffusivity of approximately $2 \times 10^{-6}$ cm$^2$/sec. The solubility of the nitric oxide in the formamide solution is $2.62 \times 10^{-6}$ moles/liter for a nitric oxide partial pressure of 1.0 atm. A liquid membrane having the same characteristics as described in Example 4 is used. A tidal displacement of $\Delta x/L = 1.0$ in the liquid membrane is selected, driven by oscillating pressure differential that has a maximum of about 0.03 atmospheres. At an angular oscillation frequency of 30.0 radians/sec an augmentation in transport of a factor of 750 is achieved, yielding an effective membrane thickness of 0.65 $\mu$m. In this case the flux of NO across the membrane is given by:

$$N_{NO} = (a\ D_o\ \epsilon\Delta c/L_{eff}) = 2.0 \times 10^{-8}$$

moles/(sec cm$^2$)

provided that the transport process is diffusion limited (as is true in this case), and which is considerably greater than that reported in the literature using a much thinner 103 $\mu$m FeCl$_2$/formamide liquid membrane with no oscillations.

Although the foregoing invention has been described in some detail by way of illustration and example for purposes of clarity of understanding, it will be obvious that certain changes and modifications may be practiced within the scope of the appended claims.

What is claimed is:

1. An apparatus for enhancing mass transfer of a chemical species present in a first fluid through a liquid membrane by selective enhancement of the mass transfer rate of said chemical species through the liquid membrane comprising a heterogeneous support that includes a first layer having a plurality of pores extending therethrough, a second layer having a plurality of pores extending therethrough, and a third layer having a plurality of pores extending therethrough, wherein said pores of the first and third layers are positioned in fluid communication with the pores of the second layer so that the second layer is sandwiched between the first and third layers, and wherein the average pore diameter of the pores in the first and third layers are selected to be greater than that of the pores of the second layer, a liquid introduced into the pores of the first, second, and third layers, wherein said liquid forms a supported liquid membrane in contact with said first fluid containing a chemical species to be separated, and means for oscillating said liquid at a predetermined frequency selected to enhance the mass transfer rate of said chemical species.

2. An apparatus for enhancing mass transfer of a chemical species present in a first fluid through a supported liquid membrane and into a second fluid, thereby separating said chemical species from other chemical species present in the first fluid comprising, a heterogeneous support that includes a first layer having a plurality of pores extending therethrough, a second layer having a plurality of pores extending therethrough, and a third layer having a plurality of pores extending therethrough, wherein said pores of the first and third layers are positioned in fluid communication with the pores of the second layer so that the second layer is sandwiched between the first and third layers, and wherein the average pore diameter of the pores in the first layer and third layers are selected to be greater than that of the pores of the second layer, a liquid introduced into the pores of the first, second, and third layers, wherein said liquid forms a supported liquid membrane in contact with said first fluid containing a chemical species to be separated, and means for oscillating said liquid at a predetermined frequency selected to enhance the mass transfer rate of said chemical species through the pores by inducing oscillatory laminar flow of the liquid within those pores.

3. An apparatus for separating a desired chemical species in a first fluid from other chemical species present in the first fluid comprising a heterogeneous support that includes a first layer having a plurality of pores extending therethrough, a second layer having a plurality of pores extending therethrough, and a third layer having a plurality of pores extending therethrough, wherein said pores of the first and third layers are positioned in fluid communication with the pores of the second layer so that the second layer is sandwiched between the first and third layers, and wherein the average pore diameter of the pores in the first layer and third layers are selected to be greater than that of the pores of the second layer, a supported liquid membrane that includes a fluid permeating the pores of the heterogeneous support, first and second chambers respectively containing said first fluid and a second fluid, wherein said first and second chambers are separated from each other by the supported liquid membrane, means for oscillating the liquid permeating the heterogeneous support at a predetermined frequency selected to enhance the mass transfer rate of said desired chemical species relative to the other chemical species present in the first fluid.

4. A method for separation of a desired chemical species present in a first fluid from other chemical species in the first fluid comprising the steps of placing a supported liquid membrane that includes a first layer having a plurality of pores extending therethrough and a second layer having a plurality of pores extending therethrough, said pores of the second layer positioned in fluid communication with the pores of the first layer, wherein the average pore diameter of the pores in the first layer are selected to be greater than that of the pores of the second layer, and wherein said pores are permeated with a liquid substantially immiscible with said first fluid, in contact with the first fluid, and oscillating said liquid in the heterogeneous support at a predetermined oscillation frequency selected to enhance the rate of mass transport of the desired chemical species relative to the enhancement of the rate of mass transport of other chemical species in the pores so that the desired chemical species is preferentially transported from the first fluid through the supported liquid membrane.

* * * * *